PROTECTIVE TAPE APPLICATOR

Filed Feb. 18, 1957 9 Sheets-Sheet 1

INVENTORS
FRANCIS J. DITTER
WILLIAM C. KAERCHER JR.
BY Stuart R. Peterson
ATTORNEY Feb. 17, 1959 F. J. DITTER ET AL 2,873,789

PROTECTIVE TAPE APPLICATOR

Filed Feb. 18, 1957 9 Sheets-Sheet 2

INVENTORS
FRANCIS J. DITTER
WILLIAM C. KAERCHER JR.

Stuart R. Peterson
ATTORNEY

Feb. 17, 1959 F. J. DITTER ET AL 2,873,789

PROTECTIVE TAPE APPLICATOR

Filed Feb. 18, 1957 9 Sheets-Sheet 3

INVENTORS
FRANCIS J. DITTER
BY WILLIAM C. KAERCHER JR.

Stuart R. Peterson
ATTORNEY

PROTECTIVE TAPE APPLICATOR

Filed Feb. 18, 1957 9 Sheets-Sheet 4

INVENTORS
FRANCIS J. DITTER
WILLIAM C. KAERCHER JR.
BY Stuart R. Peterson
ATTORNEY INVENTORS
FRANCIS J. DITTER
WILLIAM C. KAERCHER JR.
BY
Stuart R. Peterson
ATTORNEY INVENTOR.
FRANCIS J. DITTER
WILLIAM C. KAERCHER JR.
BY
Stuart R. Peterson
ATTORNEY

PROTECTIVE TAPE APPLICATOR

INVENTOR.
FRANCIS J. DITTER
WILLIAM C. KAERCHER JR.
BY
Stuart R. Peterson
ATTORNEY INVENTOR.
FRANCIS J. DITTER
WILLIAM C. KAERCHER JR.
BY
Stuart R. Peterson
ATTORNEY Feb. 17, 1959 F. J. DITTER ET AL 2,873,789

PROTECTIVE TAPE APPLICATOR

Filed Feb. 18, 1957 9 Sheets-Sheet 9

INVENTOR.
FRANCIS J. DITTER
WILLIAM C. KAERCHER JR.
BY
Stuart R. Peterson
ATTORNEY United States Patent Office 2,873,789

Patented Feb. 17, 1959

2,873,789

PROTECTIVE TAPE APPLICATOR

Francis J. Ditter and William C. Kaercher, Jr., Minneapolis, Minn.

Application February 18, 1957, Serial No. 640,872

30 Claims. (Cl. 154—1)

This invention relates generally to apparatus designed to apply a protective layer to an object so that its surface will not easily become marred or scratched, and pertains more particularly to a machine for applying pressure sensitive tape to the flat surfaces of panels or sheet material.

One important object of the invention is to provide a machine capable of applying pressure sensitive tape to sheet material, the faces of which must be protected during storage, shipment and/or fabrication thereof. In this regard it will be appreciated that the finish on such sheet materials as aluminum, stainless steel and plastic must be retained in substantially a perfect condition throughout various stages of handling and fabrication into articles of manufacture. While disfigured surfaces may, in some instances, be restored, this procedure has proven to be exceedingly costly and bothersome. Therefore, it has been current practice to apply pressure sensitive tape by hand to the faces of the sheets to be protected. However, this custom has been found to be time consuming, thereby increasing the delivered price to the ultimate purchaser and user of such sheets. Accordingly, it is an aim of the instant invention to apply the necessary protective tape in an efficient and inexpensive manner.

Another important object of the invention is to provide a facile way in which the tape is severed at the conclusion of a tape applying operation. More specifically, it is an aim to separate the tape that has been applied to the sheet from that remaining on the supply roll in such a manner that both the paper and the adhesive is readily separated.

Another object of the invention is to provide a machine of the foregoing character that is versatile in its operation, being adaptable to employing tapes of various widths, so that sheets or panels of different widths can be easily accommodated. More specifically, it is within the contemplation of the invention to provide a tape applying machine that can be adjusted for whatever single width tape is available or to adjust the machine for the simultaneous application of a plurality of lesser width tapes.

A further object of the invention is to provide a tape applicating machine that can be adjusted for different lengths of panels or sheets, provision being made for placing the machine in active tape applying operation at one end of the sheet and for causing severance of the tape supply at the other end of the sheet.

A further object of the invention is to provide a machine of this character that can be operated manually without need of motive apparatus, yet which lends itself readily to mechanically powered operation should circumstances so dictate.

Still a further object of the invention is to provide a tape applying machine that is of such simple construction that it will require little or no maintenance and which can be operated by relatively inexperienced personnel.

Other objects will be in part obvious and in part pointed out more in detail hereinafter.

Figure 1:
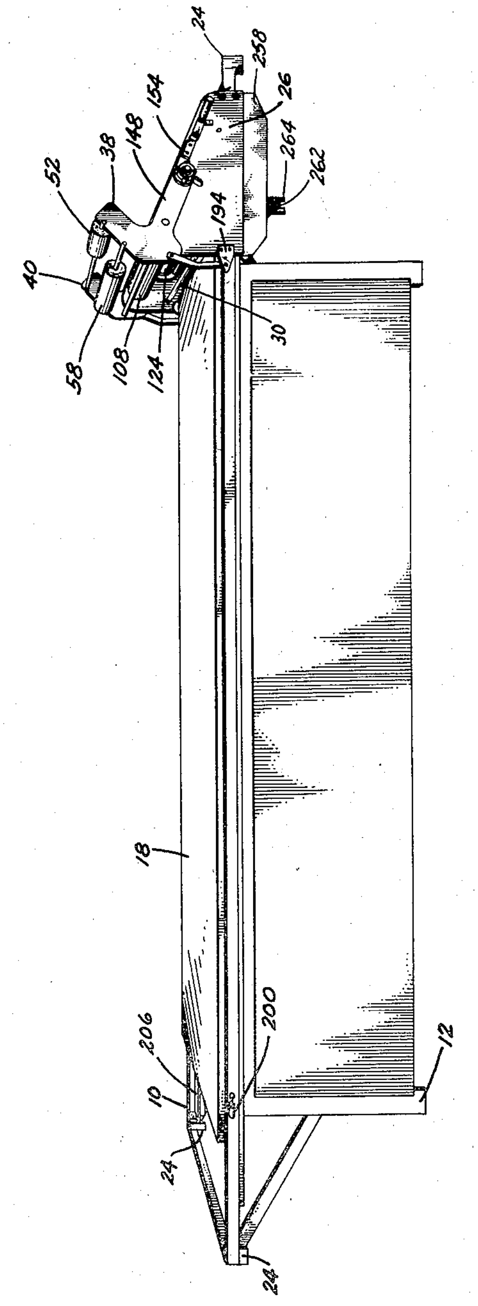
Figure 1 is a perspective view of the tape applying machine taken from one side, illustrating the carriage mechanism in a pre-operational position.

Referring in detail to the drawings, the protective tape applicator there depicted includes a table 10 having a plurality of legs 12, a top plate 14 (Figure 4) and suitable padding 16 upon which rests a sheet 18 of metal, plastic or like which is to be protected by the application of pressure sensitive tape to its flat surfaces. The table 10 is provided with a pair of spaced parallel track members 20 along which moves a carriage designated generally by the numeral 22. For the purpose of assuring that the carriage will not pass off the ends of the table, stops 24 are fixedly attached to the tracks, the carriage striking these stops at either end of the table.

The carriage 22 need not be of elaborate construction, being comprised of a pair of side plates 26, 28 in the exemplified instance which are retained in a spaced relationship by suitable cross members, one of which is depicted as a tube 30 having its ends fixedly anchored to said side plates. It is these side plates 26, 28 that have mounted thereto upper and lower wheels 32, 34 by reason of which the carriage is guided in its longitudinal path along the tracks 20.

Mounted on the carriage 22 is a rocker or cradle assembly denoted in its entirety by the numeral 36 and comprising a pair of L-shaped rocker arms 38, 40 notched at different elevations 42, 44 for the support of a pair of shafts 46, 48. On the upper shaft 46 is disposed a paper supply drum 50 having circumscribed thereabout a roll of pressure sensitive tape 52 which for the sake of discussion we will suppose to have a width of one foot. On the lower shaft 44 are two additional paper supply drums 54, 56 coacting in the support of a relatively wide roll of tape 58, which we will assume to have a width of three feet. In other words we have assumed that the panel or sheet 18 is four feet wide and is to be completely covered with the two standard size tape widths mentioned above, the covering in its applied condition bearing the numerals 52*a* and 58*a*, respectively, in correspondence with the rolls from which the tape has been removed. More will be said later on concerning the manner in which the tape is applied by the machine.

It is to be observed from the drawings that the axes of the shafts 46, 48 are offset from each other and the reason for this is so that the machine will be completely versatile in the use of tapes of different widths. Aiding in the realization of this versatility is the internal construction of the several drums 50, 54 and 56. Since the drums can be duplicates of each other, only one need be described in detail, and for the cross-sectional make-up of the drum 50 attention is directed at this time to Figure 5. The drum 50, it will be seen, comprises a cylindrical tube 60 onto which is pressed the roll of paper 52, there being circumferentially disposed serrations (not shown) at either end to prevent relative slippage between the roll of paper or tape and the tube. Spaced inwardly from either end of the tube 60 is a pair of washers or annular discs 62, 64 having their peripheries welded to the inner wall of said tube. To each of the discs 62, 64 is suitably attached, as by screws 66, a bushing 68, 70. The flanges of these bushings 68, 70 are faced with appropriate clutch lining material 72, 74, which may be held in place by the same screws 66. The lining or facing 74 bears against a washer or annular disc 76 affixed, as by welding, to one end of a sleeve 78 which extends through the bores of both of the bushings 68, 70, thereby serving as a journal therefor.

Abutting the lining 72 is a bushing 80 which is keyed to the sleeve 78 by a key 82 fitted into a keyway 84. Encircling the bushing 80 is a coil spring 86 which is interposed between the flange of the bushing and a variable tension nut 88, the nut 88 being received on a threaded portion of the sleeve 78. By tightening the nut 88 pressure is brought to bear on the coil spring 86 which forces the flange of the bushing 80 against its adjacent lining 72. Concomitantly with this happening the reaction causes the disc 76 to be pulled against its lining by way of the sleeve 78. Tightening of a set screw 90 against a fibre cushion 92 assures retention of the nut 88 in its adjusted position.

Figure 5:
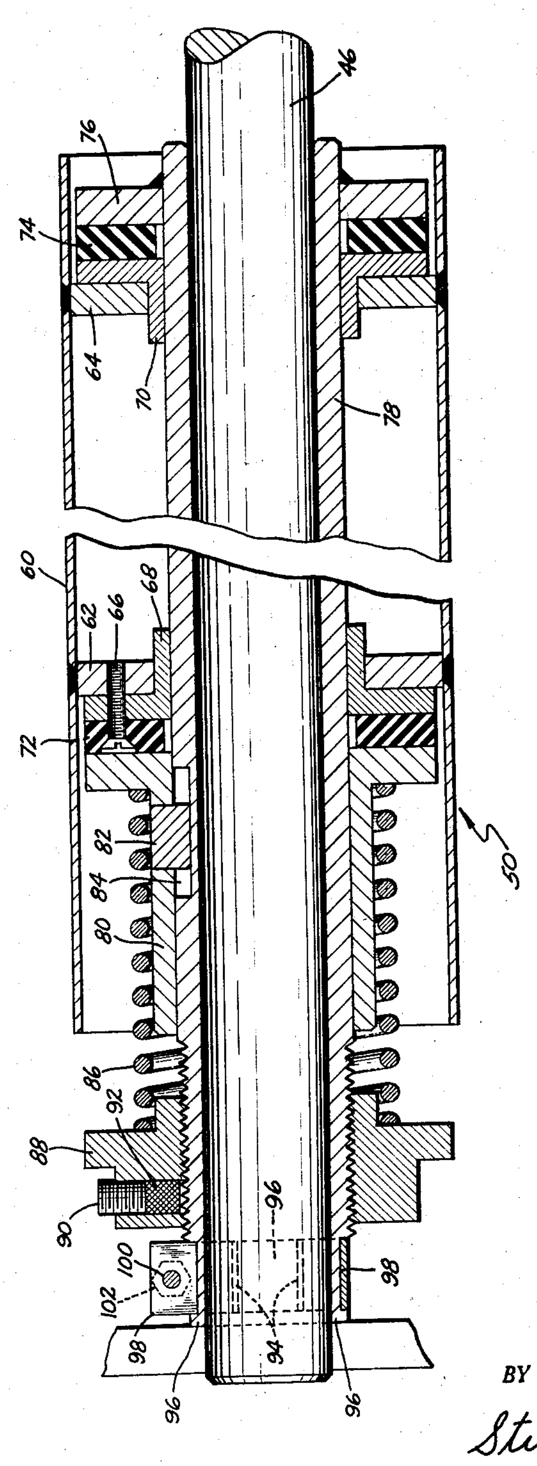
Figure 5 is a sectional view of one of the supply drums, the view being in the direction of line 5—5 in Figure 3.

While it is planned that the sleeve 78 be longitudinally positionable on the shaft 46, rotation of the drum 50 is to take place by virtue of the bushings 68, 70 acting as bearings about the sleeve. Accordingly, in order to adjust the drum 50 relative to its shaft 46, the left end of the sleeve as viewed in dotted outline in Figure 5 is provided with a plurality of axially directed slots 94, thereby forming a series of spring fingers 96 therebetween. These spring fingers 96 have circumscribed thereabout a flexible clamping band 98 which may be tightened against the innerjacent fingers by means of a bolt 100 and nut 102 combination.

A considerable amount of description has been devoted to explaining the construction of the drum 50. From this explanation it is believed readily understandable that the respective clamps 98 permit the various drums 50, 54, 56 to be moved along their shafts 46, 48 until substantially an edge to edge relationship is established between the tape section **52*a*, 58*a*. Owing to the offset relationship of the shafts, there can be no interference between the drum 50 and the drum 54, such a condition happening if both were on the same shaft because of the presence of the variable tension nut or knurled knob 88 and the clamp 98 on the drum 54. Also, it will be discerned that the tension that must be applied to the rolls 52, 58 in order to effect removal of their pressure sensitive paper can be set to an optimum value merely by adjusting the various nuts 88. This is of the greatest importance where two drums, as are the drums 54, 56**, are employed in tandem for the support of a single roll of tape having a fairly sizeable width.

Proceeding now with the description of the rocker assembly generally, a tube 104 connects the rocker arms 38, 40 together for movement in unison about a pivot rod located at 106. The rod 106 is also utilized in the illustrated situation for the support of an idler roller 108 sheathed with rubber 110. The unsensitized backs of the two tapes bear against this roller 108 in the course of their travel, as can be seen to better advantage in Figure 4.

Figure 2:
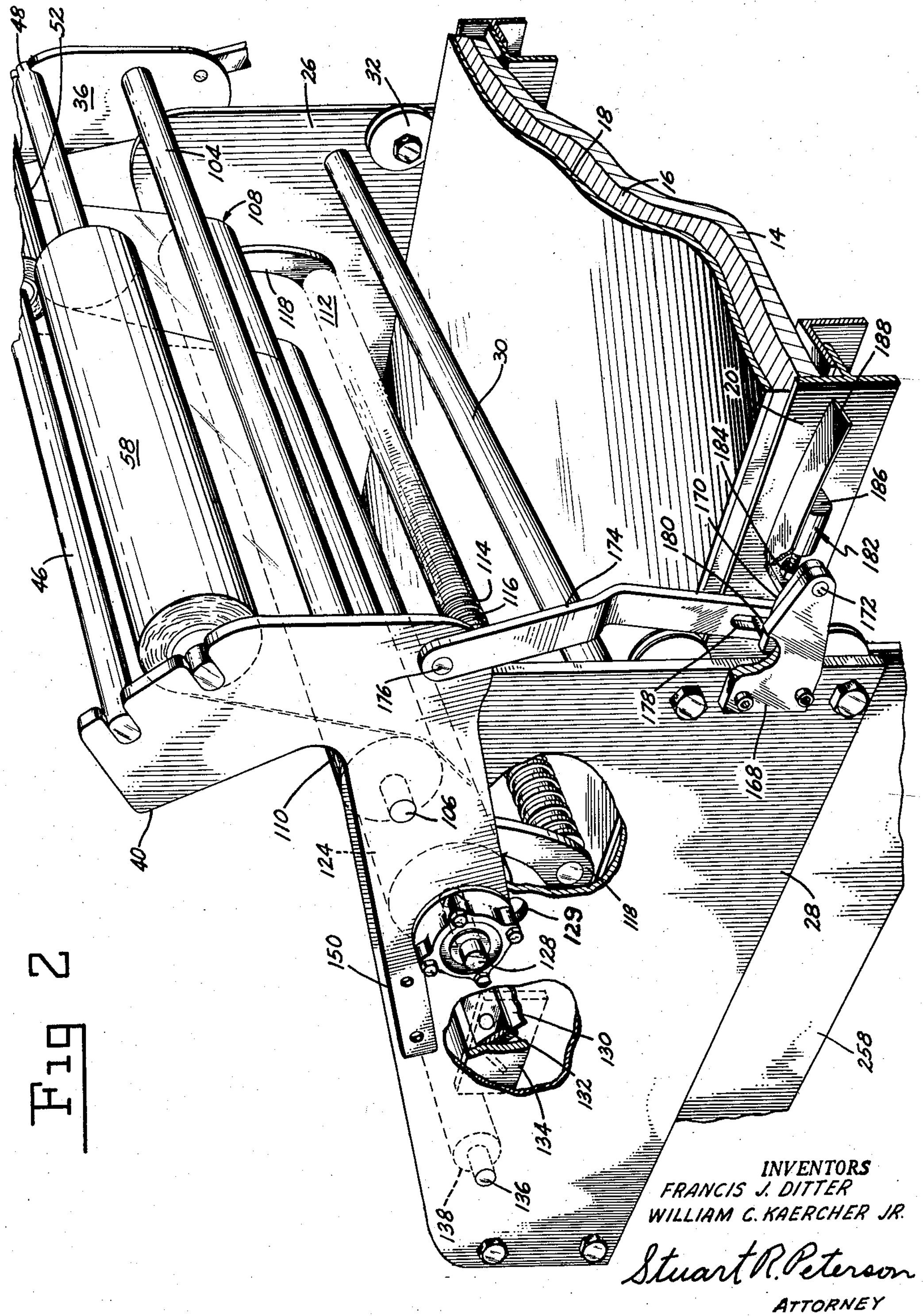
Figure 2 is another perspective view from the other side with the carriage mechanism moved forward against a first positioning stop for the inauguration of a tape applying operation.

From the roller 108 the tapes are directed over a pick-up or guide bar 112 having a plurality of alternating ribs 114 and grooves 116 so that the sensitized side of the tapes will not adhere thereto (see Figure 2). An important function of the bar 112 is to pick up the free tape ends after severance. The bar 112 is carried at one end of a pair of L-shaped arms 118 individually pinned for pivotal movement at 120 to the rocker arms 38, 40. In order to prevent the groove guide bar from dropping below a preferred elevation suitable limit means may be affixed to the rocker arms 38, 40 so as to prevent the arms 118 from rotating beyond a desired point. Juxtaposed with respect to the guide bar 112 is a pressing or applicator roller 124 having a rubber sheath 126 thereon which forces the tapes **52*a*, 58*a* onto the upper face of the sheet 18. From Figure 3 it can be seen that the roller 124 is rotatably mounted on a shaft 128 having its ends journaled in the rocker arms 38, 40, the end portions of said shaft passing through arcuate slots 129 located in the side plates 26, 28 so that the rocker assembly 36 may be rocked or tilted with respect to the carriage 22 in a manner soon to be made manifest. The pins 120 also extend through these slots 129 and thus the pick-up bar 112 is revolved about the shaft 106 in unison with the roller 124**.

Next in the sequence of parts is a transverse knife element 130 fixed to one flange of an angle member 132. Each end of the angle member 132 is equipped with a mounting plate 134 by which the angle member 132 and its knife 130 may be supported on the carriage 22 by attachment to its side plates 26, 28. Although not of sufficient magnitude so as to be noticeable in the drawings, the knife 130 may be canted or angled with respect to the carriage, thereby facilitating tearing of the tapes, as will presently be made apparent. From Figure 2 it can be perceived that the blade or knife 132 has an irregular edge which is scalloped or undulated in appearance, thereby facilitating the cutting of the somewhat gummy adhesive as well as the paper backing.

Supported toward the rear end of the carriage 22 is a shaft 136 carrying a roller 138 provided with a rubber sheath 140. The shaft 136 actually is supported on the lower ends of arms 142 having their upper ends pivotally connected to the side plates 26, 28 through the medium of pins 144. To avoid having the roller 138 drop or pivot to a position too low, suitable stop members 146 may be affixed to the side plates 26, 28 in the pivotal path of the arms 142.

Figure 3:
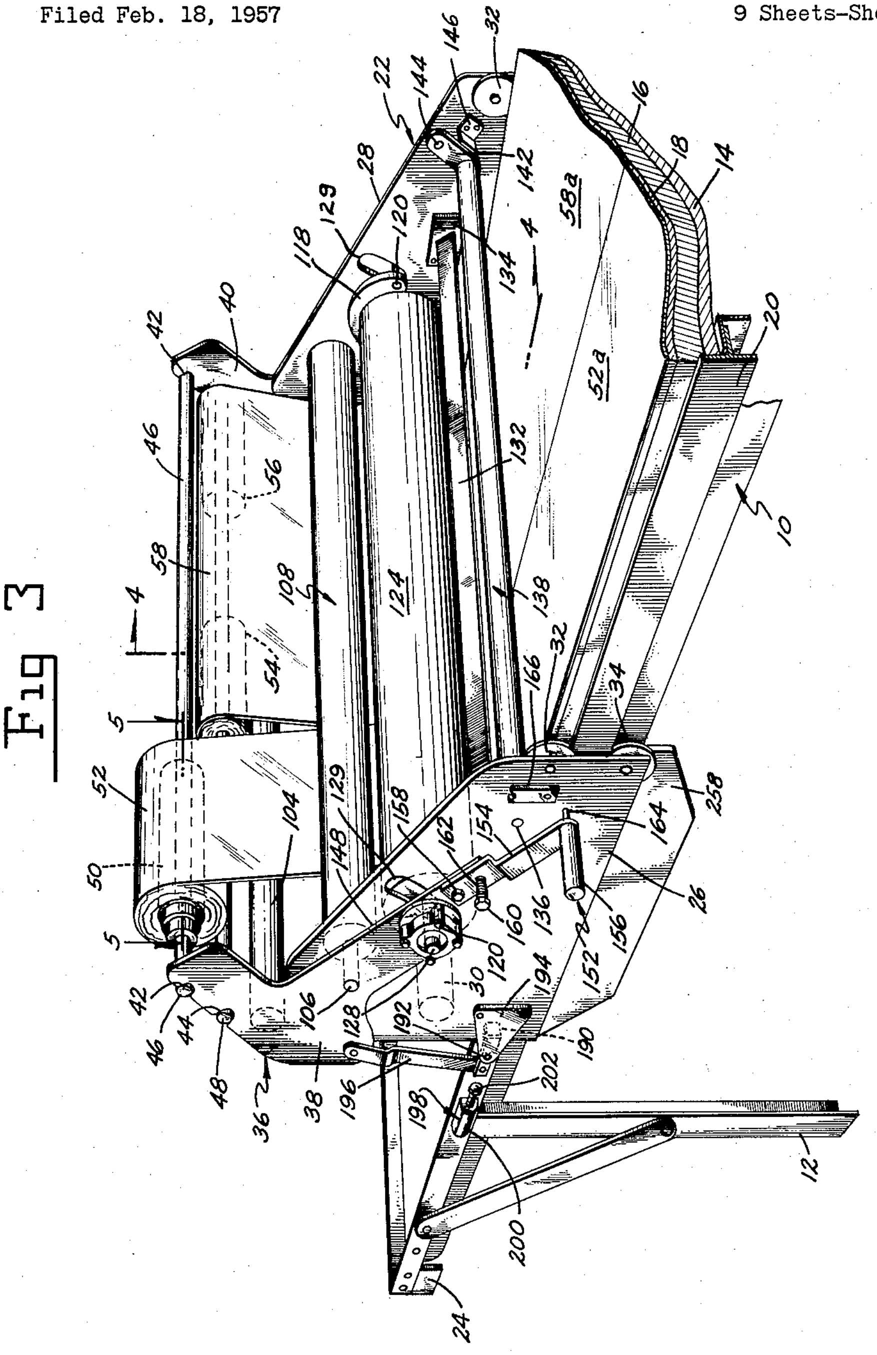
Figure 3 is a perspective view of the carriage picturing the actual application of two tapes of unequal width, the view showing the carriage as it approaches a second positioning stop.

While basis has been laid for the pivoting or rocking of the rocker assembly 36, together with the various elements supported thereby, the specific manner by which this is brought about has not been described. Accordingly, it will be noted that the rocker arms are provided with integral extension 148, 150. To the extension 148, visible in Figures 1 and 3, is attached a handle unit 152 including a shank 154 and grip portion 156. It will be observed that the shank is in the form of a strip having connection with the extension 148 by means of a first pin or bolt 158 and a second pin or bolt 160, the latter element being longer and having a coil spring 162 circumposed thereabout so that the shank 154 can be manually deflected from its normally planar relationship with the extension 148. By locating a catch element 164 on the handle shank 154 the handle unit 152 may be retained at a preferred elevation by virtue of engagement of the catch 164 with an upstanding keeper 166 secured to the side plate 26. Thus, the rocker assembly may be lowered or rotated in a clockwise direction from the position pictured in Figure 1 to that of Figure 3 by disengaging the catch 164 from its keeper 166, merely by laterally displacing the handle unit 152.

Provision is made for certain mechanical movements occurring during the rocking of the assembly 36. In this regard attention should be given to Figure 2 where it will be seen that a triangular plate 168 is anchored to the side plate 28, projecting therefrom to provide support for an L-shaped dog element 170 pivotally mounted at 172. With the rocker assembly 36 held in its raised position, that is with the catch 164 engaged, the dog element 170 is retained in a horizontal position by reason of a link member 174 pivotally connected to the rocker arm 40 by a pin 176, the lower end of the member 174 having an elongated slot 178 therein through which passes a pin 180 carried by an extension on the dog element 170.

Through the agency of the link member 174 the dog element is held at an elevation such that one leg of the dog element will strike a start position control stop 182 mounted on one side of the track 20 (Figure 2) when the carriage 22 is moved from its extreme initial position as viewed in Figure 1. The stop may be of simple construction, involving in the present instance a bolt 184 threadedly received in a lug 186 secured to the track 20. In this manner, the stop 182 is rendered adjustable and can be set in agreement with the initial or beginning edge of the sheet 18 at which edge the tape application is, of course, to begin. By reason of a cam strip 188 overlying the stop the dog element 170 will not be arrested during the return portion of the carriage's travel, that is after the tape sections **52*a*, 58*a* have been applied, for the slot 178 permits the cam 188 to raise the dog element 170 relative to the member 174, the dog element then dropping back to its depicted position after overriding the stop 182 on its return trip. Although the dog element 170 engages the stop 182 when positioning the carriage preparatory to starting a tape applying run, it will be understood that rocking the rocker assembly 36 clockwise, as viewed in Figure 1, by disengaging the catch 164 from its keeper 166 will result in the element 170 pivoting upwardly out of engagement with the stop 182 and sufficiently high so as to clear the cam strip 188**.

In addition to the dog element 170, there is a second L-shaped dog element 190 on the side of the carriage 22 in Figures 1 and 3. This dog element 190 is pivotally carried by a pin 192 mounted on a triangular plate 194 similar to the earlier mentioned plate 168. A link member 196 articulatively connects the dog element 190 to the rocker arm 38, so that when the rocker assembly is pivoted clockwise, as viewed in Figure 1, to the position illustrated in Figure 3, the dog element 190 will be pivoted into a horizontal position. When in this horizontal position, the dog element 190 is in obstructive alignment with a finish position control stop 198 located so that the carriage will be halted at the proper point at the opposite or finish end of the sheet 18. As with the stop 182, the instant stop may comprise a lug 200 having a bolt member 202 threadedly received therein.

Figure 4:
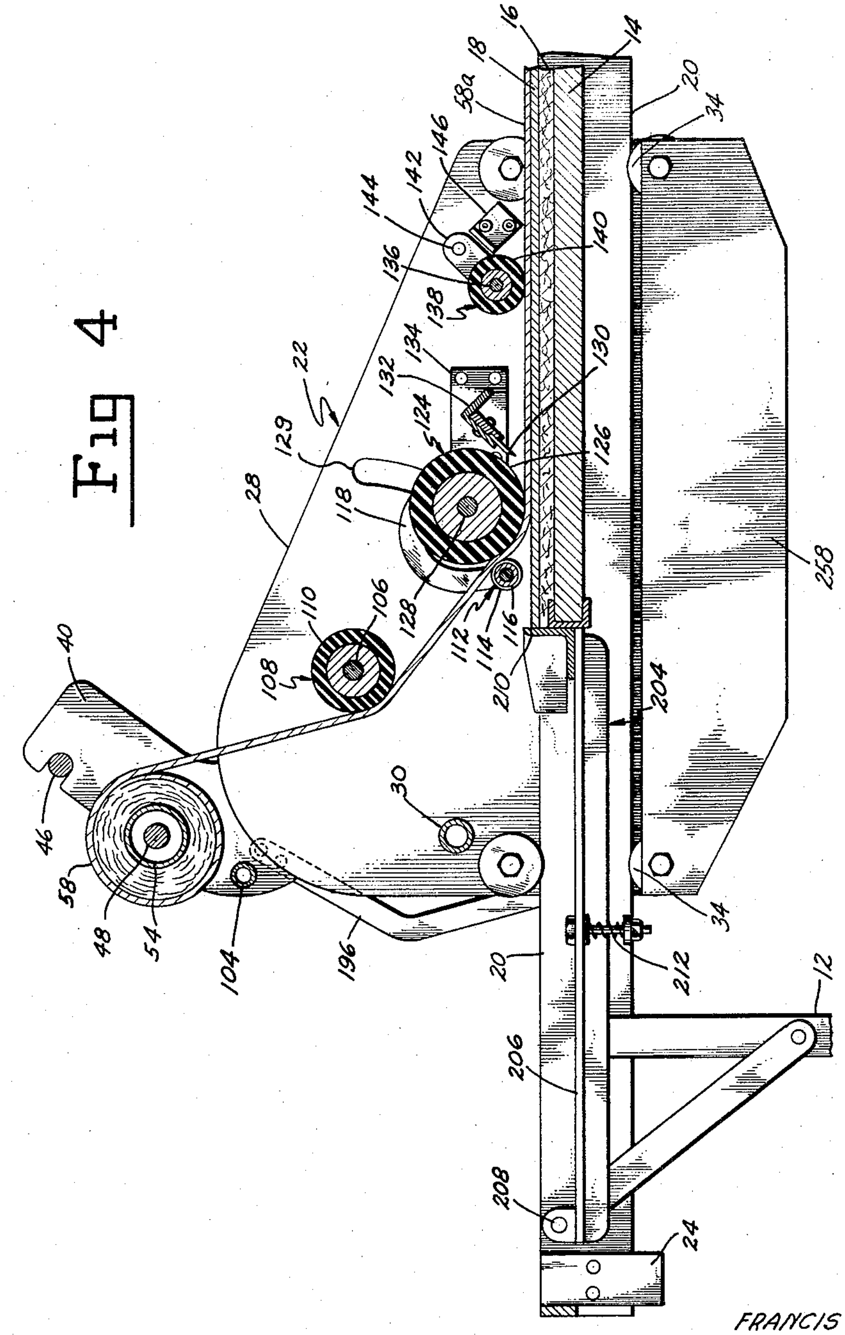
Figure 4 is a sectional view taken in the direction of line 4—4 in Figure 3.

As best seen in Figure 4 the far or finish end of the table 10 is provided with a U-shaped frame 204 including a pair of side angle members 206 (one of which is visible) having a pivotal connection at 208 to the sides of the tracks 20 and supporting at their other ends a transverse angle member 210 functioning as a positioning stop for the sheet 18 when it is placed upon the table 10. A spring 212 on each side of the frame 204 biases it in a direction so that the upper edge of the transverse angle member 210 projects above the table's level, yet rendering the frame depressible in order for the rollers 124, 138 to pass thereover as the carriage 22 moves into an extreme left-hand position as viewed in Figure 1.

Before actually effecting a tape applying operation certain preparatory steps must be performed. In this regard, the proper number of tape supply drums must be chosen for the particular width of sheet to be covered. Where the sheet is four feet wide, as hereinbefore assumed, three drums will suffice, these having been denoted by the numerals 50, 54 and 56. However, other combinations of supply drums are easily arranged, depending upon the specific width of the sheet to be protected.

Having selected the drums 50, 54 and 56, for the four foot wide sheet 18, the several drums are then mounted on the two different shafts 46, 48, as illustrated best in Figure 3. To do this, one end of each shaft 46, 48 may be easily lifted from the notches 42, 44 in either side plate 26 or 28 so that the various drums 50, 54 and 56 can be passed onto the shafts, the sleeve 78 (Figure 5) of each drum being of a size to encircle these shafts. The supply rolls 52, 58 of pressure sensitive tape may be pressed onto the drums 50, 54 either before or after mounting on the shafts.

Once the rolls 52, 58 are on the drums 50, 54 and 56 (the latter two being spaced apart in this instance so as to support the ends of the three foot roll 58), they must be axially oriented on the two shafts 46, 48 so as to create an abutting or slightly overlapping of the adjacent tape edges. To accomplish this, all that need be done is to tighten the various clamping bands 98 provided at one end of each supply drum. To permit access to the clamping bands on the two drums 54, 56, care should be exercised in the mounting of these drums to place the clamping band ends in an outboard relation with each other, that is with these mentioned ends remote with respect to each other. When the drums have been properly located on the shafts, they will be retained in their respective positions by merely tightening the nut 102 on the bolt 100 associated with each band 98.

For the purpose of adjusting the tension on each tape 52, 58 resort is now made to the various knobs or tension nuts 88. Tightening of these elements will increase the tension on the tape and loosening will reduce the tension. Through the medium of the set screw 90 and its underlying fibre cushion 92 the knurled nut of each supply drum will be held fast and the tension thereby maintained. Actually, the tension adjustment should be of fairly small magnitude, for the less tension there is the less effort will be needed in moving the carriage 22 through an operational cycle, as will soon become evident. One reason for the tension control is because the tightness with which various rolls of tape are wound at the factory will vary; the tension control permits tension equalization of the various rolls in use. More importantly yet, another reason for the control resides in the facile cutting of the tape at the conclusion of a tape applying run, as will soon be made manifest in describing a typical tape applying operation.

Prior to making an actual tape applying run a "dry" run should be made during which time the start position control stop 182 can be adjusted and also the finish position control stop 198. Having done this, the tape from the rolls 52 and 58 can be loaded or fed into place relative the pressing roller 124 by raising the pick-up bar 112, it being pivotal about the pins 120 (see Figure 4). During this procedure the rocker assembly 36 will be in a raised position, held so by reason of the catch 164 engaging the keeper 166. This permits the free tape ends to be pulled past the pick-up bar 112 a preferred distance, say three or four inches. The pick-up bar 112 can then be allowed to drop, the stops 122 preventing a downward fall beyond a desired point.

Having performed the foregoing preliminary steps, the machine is ready for an actual operational run. To do this, the carriage 36 is pushed against the track stops 24 located at the start end of the table 10 (the right-hand as seen in Figure 1), it having been more convenient to load the tapes at the other or finish end. The carriage is then moved from its extreme right-hand position to the left, bringing the dog element into obstructive engagement with the start position control stop 182 (see Figure 2) and thereby arresting further travel of the carriage in this direction. If the bolt 184 has been set properly, the pressing roller 124 will now be located somewhat to the left of the right-hand edge of the sheet 18 but with the edge of the tapes at this edge of the sheet. The machine is therefore conditioned for the inauguration of the tape applying act itself.

To start this phase of the operation, the handle unit 152 is displaced laterally, thereby causing disengagement of the catch 164 from its keeper 166. Due largely to the weight of the rollers 124 and 138, the carriage then pivots in a downward direction (clockwise in Figure 1 and counter-clockwise in Figure 2) until the roller 124 presses the free ends of the tapes 52*a* and 58*a* against the beginning end of the sheet 18. Concurrently with this happening, the link member 174 disengages the dog element 170 from the stop 182, raising sufficiently so that it is free to pass over the stop 182 as well as the cam 188. This is occasioned, of course, by reason of the articulative connection of the link member 174 with the rocker assembly 36. Also occurring simultaneously with the above is the lowering of the dog element 190 into a horizontal position so that it is in prospective obstructive registry with the stop 198 at the finish end of the table 10 (see Figure 3). If the stop 182 has been adjusted properly, the carriage 22 should then be located so that the roller 124 is several inches from the edge of the sheet 18, although the free tape ends lie adjacent this edge. The carriage can then be backed up slightly to assure a good pressural engagement of the tape ends with the edge of the sheet 18.

The carriage 22 is now free to be moved along the tracks 20 toward the other end of the table 10 and when so moved by the operator pushing on the handle unit 152, preferably with a downward component; pressure sensitive tape from the rolls 52, 58 is unreeled, the roller 124 applying pressure to the upper or non-sensitized faces of the tapes 52*a*, 58*a* with the result that the tapes become fixed or firmly adhered to the sheet 18. Assuming that the bolt 202 of the stop 198 has been properly adjusted, the carriage 22 will be moved through the position depicted in Figure 4 and halted just about as the roller 124 reaches the left hand edge of the sheet 18, as viewed in Figure 6, for the dog element 190 in its horizontal position engages said stop 198. Once this has happened, the handle unit 152 should be lifted, thereby rocking the assembly 36 in a counter-clockwise direction to raise the roller 124. This also frees the dog element 190 from the stop 198.

Figures 6, 7, 8:
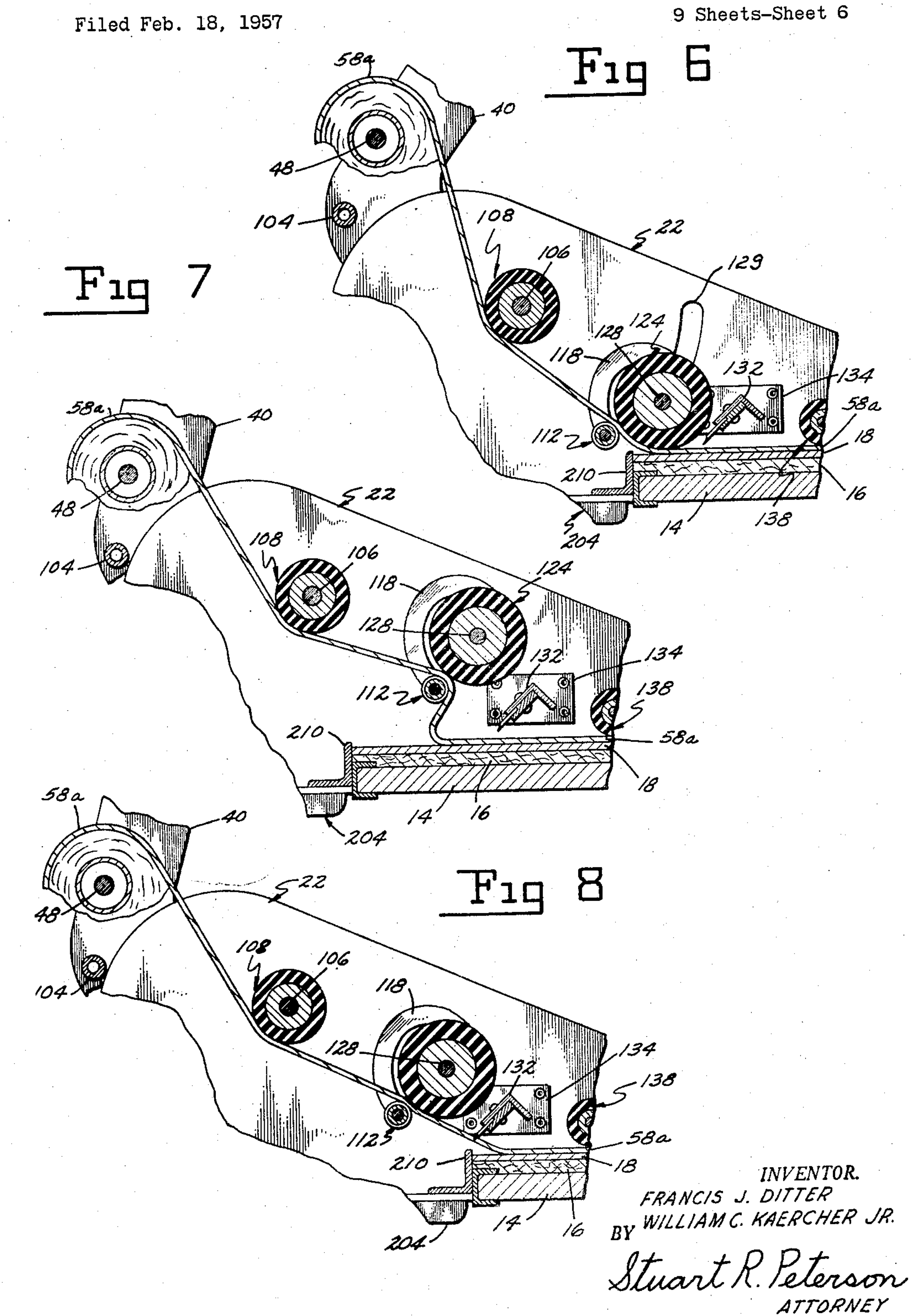
Figures 6–8 are fragmentary sectional views resembling Figure 4, but showing certain sequential steps taking place just prior to and during the severance of the tapes at the finish end of the table.

Next, and this is a very important feature of the invention, the carriage 22 is backed up approximately three or four inches at a rather slow rate to the position shown in Figure 7, and then pushed forwardly quite rapidly, plunging the knife 130 against the now inclined tapes 52*a* and 58*a* to cause severance thereof at an elevation just above the left end of the sheet 18, as illustrated in Figure 8. By disposing the knife 130 at an angle, it can be appreciated that this angle or cant produces a severing or shearing action in a progressive fashion rather than in an abrupt manner. It is the special function of the trailing or follow-up roller 138 to press the now sheared tape ends firmly into place upon the sheet 18, although it has been aiding in applying the tape 52*a* and 58*a* throughout the applicating run. The track stops 24 at the finish end of the table 10 assure that the carriage 22 will not leave the tracks 20. Also, in returning the carriage 22 to the right or starting end of the table, no interference is encountered with the stop 184 because the cam 188 lifts the dog element 170 over this stop, the slot 178 in the link member 174 permitting this to occur. However, once the carriage 22 has moved the dog element 170 past the stop 184, it falls back into a horizontal position due to gravity or spring tension, being in readiness for a succeeding tape applying operation. This same action transpires when the carriage is loaded with the tape when down at the finish end, better access being had for this, as previously pointed out.

From the foregoing it is believed that the general operation of our protective tape applicator is easily understood. However, it may be pointed out that in a number of instances the sheets to be covered with tape will be quite thin. It has been discovered from actual practice that relatively thin sheets require means for holding the sheets to the table 10 at the start end thereof in order to prevent buckling of such thin sheets due to the longitudinal compressive forces transmitted from the tape or tapes being applied. In other words, it will be recognized that appreciable tensile pull is transferred to the tapes 52 and 58 by the movement of the carriage 36 and that such pull is reactively shouldered by the sheet 18 being covered. With thin sheets, as we are now concerned with, the length thereof makes the situation analogous to a thin column placed under comparatively heavy compressive loads without adequate lateral support intermediate its ends. Hence, the aforementioned likelihood of buckling.

The buckling alluded to above is obviated in the present instance by firmly gripping the forward or start edge of the sheet 18 when such sheet is of thin gauge stock. Accordingly, attention is at this time directed to Figures 9 and 10 where a mechanism A for performing a gripping operation is depicted. From Figure 9 it can be observed that the gripping mechanism comprises a plurality of clamping devices 214, each including a vertically reciprocal clamping member 216. Individually, each clamping member 216 comprises a horizontal upper finger 218 directed toward the finish end of the table 10 and therefore adapted to overlie the foremost edge of the sheet 18. The intermediate or shank portion of the clamping members 216 are formed with a 90° twist and the lower ends of these members are provided with an aperture the function of which will presently be explained. By reason of a bracket 222 associated with each clamping member 216, which brackets have an offset intermediate section and are fixedly attached at their respective ends to the forward end of the top plate 14 of the table 10, the clamping members are all constrained to follow the above-mentioned reciprocal path.

Fixedly secured to the underside of the top plate 14 of the table is a plurality of U-shaped brackets 224, these brackets carrying longitudinally projecting integral extentions 226 at their forward ends. Each extension 226 is channeled or U-shaped and by means of a transverse pin 228 a link or arm 230 is pivotally supported. A second pin 232 pivotally connects the other end of each link to the lower end of one of the clamping members 216 via the aperture provided therein that has previously been mentioned. The link 230 is of such configuration that an eccentric portion is provided, a pin 234 passing this eccentric or offset portion and one end of a lever 236. The lever 236 is pivotally connected intermediate its ends to one end of an upwardly inclined link 238 by a pin 240. The other end of the link 238 is adjustably anchored to the extension 226 in each instance by way of a threaded bolt element 242 having a swivel end 244 and a knurled adjusting knob 246. As will become apparent shortly the element 242 may be advanced or retracted to vary the degree of clamping pressure applied to the sheet 18 by each member 216. Although the respective clamping members 216 have been depicted in a gripping position, it will be recognized that a coil spring 249 has its ends attached to the extension 226 and link 230 of each device, such spring functioning to lift its associated clamping member 216 when in a non-clamping position.

Continuing further with the description of the overall gripping mechanism, the various levers 236 are actuated in unison by a cross bar 248 engageable with the upper sides of the free ends of these levers. The under sides of the lever free ends are engageable by loop elements 250 attached to the cross bar 248 at appropriately spaced intervals, as by welding or brazing. It will be noticed that the opposite ends of the cross bar 248 are secured to a pair of rocker arms 252 pivotally connected intermediate their ends to a portion of the tracks 20 by means of pins 254. A hand bar 256 is secured between the other ends of the rocker arms 252. When the hand bar 256 is manually depressed it follows that the loops 250 will concertedly act against the levers 236 to produce a counter-clockwise pivoting of the links 230 about their pins 228. Such action causes the pin 232 to be forced downwardly, thereby carrying the clamping members 216 downwardly therewith with the consequence that the fingers 218 will pressurally bear against the forward edge of the sheet 18 or the table itself if no sheet is present.

To avoid damaging the rollers 124 and 138, as could readily happen if these rollers engaged the clamping members 216 when left in a raised position, the carriage 22 is equipped with a cam plate 258 mounted on each side plate 26, 28. As can best be seen from Figures 1, 3 and 4, the cam plates 258 are formed with upwardly inclined edges at either end. Disposed for engagement by the cam plates 258 are follower rollers 260 mounted adjacent each end of a cross bar 262. The bar 262 is constrained for vertical deflection by reason of a pair of bifurcated members 264 affixed to opposite sides of the table 10, the bifurcations straddling the ends of the bar 262 in the performance of their guiding function. The cross bar 262 is suspended from the lower ends of the clamping members 216 by an equal number of coil springs 266. Hence, when the cam plates 258 encounter the rollers 260 and depress the cross bar 262, as they will do when the carriage 22 is moved into the vicinity of the right end of the table 10 as viewed in Figure 1, the bar through the intermediary of the springs 266 pulls the clamping members 216 downwardly against the sheet 18 if it has been then placed on the table 10 or onto the table itself if no sheet is present. The force applied to the clamping members 216 via the springs 266 is of course ample to overcome the actions of the several springs 249 and also the inertia or weight of the rocker arms 252 plus their interposed bars 248, 256.

Figure 9:
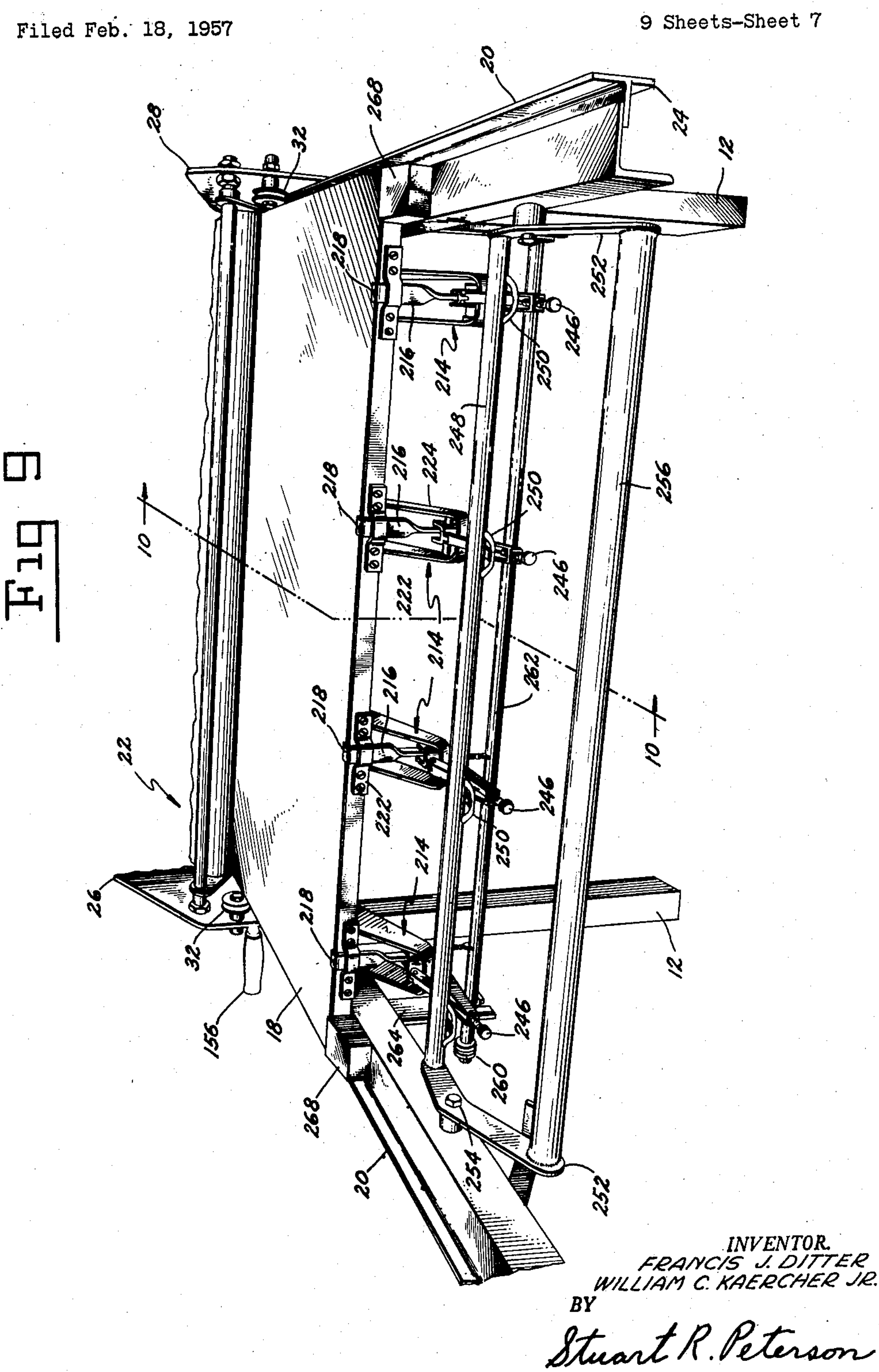
Figure 9 is a fragmentary end view of the start end of the machine illustrating one sheet gripping mechanism.
Figure 10:
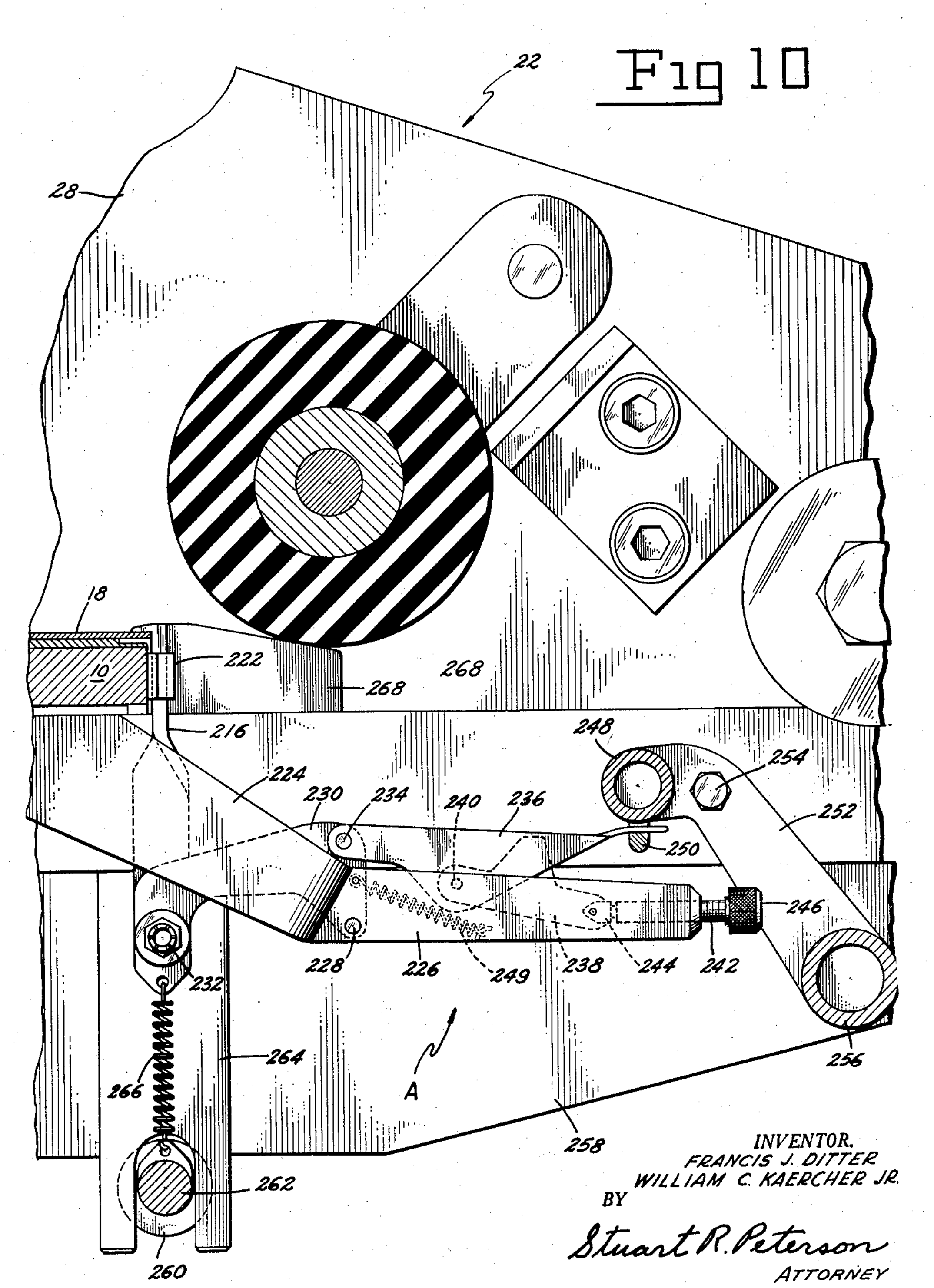
Figure 10 is a sectional view taken in the direction of line 10—10 of Figure 9.
Figure 12:
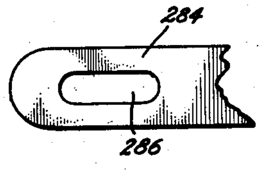
Figure 12 is a fragmentary view of an arm utilized in the embodiment set forth in Figure 11.

As can be seen from Figures 9 and 10, a pair of tapered blocks 268 serve to elevate the rollers 124 and 138 onto the sheet 18. However, when raised, which is necessary to introduce new sheets 18, the clamping members 216 project above the upper faces of these blocks and above the general plane of the table top. However, the presence of the cam plates 258, as hereinbefore explained, assure that no obstructive interference can ever exist between the rollers 124 and 138 with the fingers 218.

Figure 11:
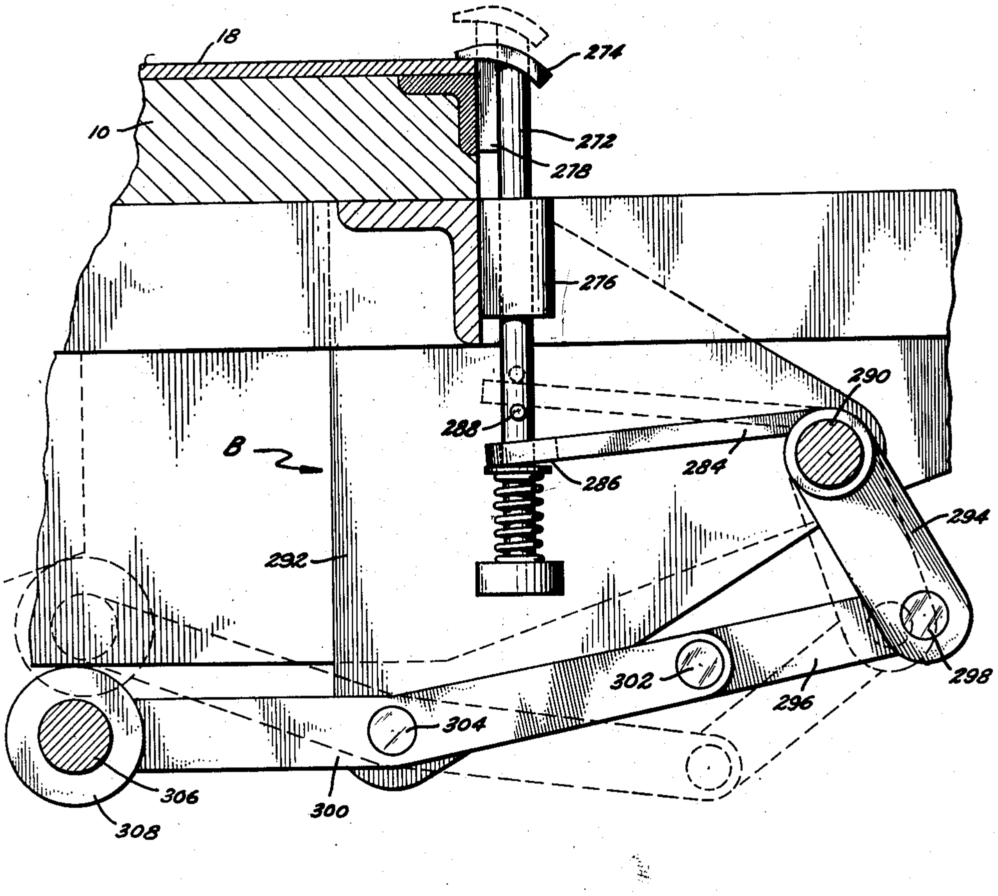
Figure 11 is a sectional view corresponding to Figure 10 but representing a different sheet gripping mechanism.

Another embodiment B for gripping the forward or start edge of the sheet 18 is pictured in Figure 11. This modification resembles somewhat the embodiment set forth in Figures 9 and 10, being preferred in some installations largely because of its simplicity and compactness. Although only one clamping device 270 is depicted in Figure 11, it will be understood from Figure 9 that in practice a number of such devices will be utilized, the devices 270 corresponding in function to the devices 214 of embodiment A. Each device 270 is comprised of a vertically reciprocal clamping member 272 in the form of a rod having a horizontal upper finger 274 welded or otherwise secured thereto. The fingers 274 are directed toward the finish end of the table 10 to overlie the foremost edge of the sheet 18. A sleeve or bracket 276 affixed to this end of the table encircles an intermediate portion of each member 272, and a key 278 prevents rotation of the clamping member about its own vertical or longitudinal axis. Additionally, the key 278 in each instance serves to align the edge of the sheet 18 with the edge of the table.

At the lower end of each rod or member 272 is an enlarged head or nut 280, the purpose of which is to retain a coil spring 282 in its encircling relation with the rod member 272. The various springs 282 are engaged at their upper extremities by an equal number of arms 284 having an aperture 286 therein so as to permit straddling and relative movement of these arms with respect to the several members 272. Above each arm 284 is a transverse pin 288 by which the member carrying it can be raised when the arm is pivoted clockwise as viewed in Figure 11.

All of the arms 284 are attached to a cross bar 290 having its opposite ends journaled in a pair of depending plates 292, one at each side of the table 10. Adjacent each end of the cross bar 290 is an additional arm 294 by which the bar 290 can be pivoted to swing the arms 284 in unison in a vertical plane. An overcenter mechanism or linkage including a link 296 is articulatively attached to the free end of each arm 294 through the intermediary of a pin 298. These two links 296 are in turn pivotally connected to an actuating lever 300 by means of pins 302. The two levers 300 are pivotally supported by the side plates 292 by reason of pins 304. The other ends of the levers 300 support a cross bar 306 equipped with a pair of follower rollers 308 engageable by the cam plates 258 on the carriage 22. The links 296, there being one on each side of the table 10, and the levers 300, also one on each side, constitute an overcenter mechanism, the dotted line position signifying the position of the parts when the cross bar 306 is not depressed by the cam plates 258 and the solid line position indicating the movement into a beyond dead center position of the pivot pin 302.

The functioning of embodiment B is very simple. When the cam plates 258 depress the bar 306 the lever 300 appearing in Figure 11 is rotated counter-clockwise about its pin 304 to raise the pin 302. This action results in the arm 294 being rotated in a counter-clockwise direction about its fixed pivot as determined by the cross bar 290. Since the arms 294 and 284 are fixed to the cross bar or shaft 290 the free end of each arm 284 is urged downwardly, compressing the spring 282 of each device 270 to the extent necessary to cause the fingers 274 to be lowered sufficiently so that there is no objectionable interference with the rollers 124, 138 as they pass by.

Of course, the foregoing has presupposed that the cross bar 306 has not been manually depressed. When it is desired to clamp a relatively thin sheet 18 preparatory to performing a tape applying operation, depression of the bar 306 does the same thing with one notable exception between the two happenings. This exception resides in the possibility that an overcenter movement of the pins 302 may not be wanted when the bar 306 is depressed by cam action, whereas such an overcenter relationship is necessary when manually moving the bar 306. Accordingly, the cams 258 or the linkage dimensions may be selected so that the two pins 302 (one on each side) do not move past a line extending through the pins 298, 304. It is readily understandable, it is believed, that the cross bar 306 can be manually moved through a greater arc about the pivot pins 304 so as to establish a past dead center relationship. Also, it may be pointed out that one nicety of the invention resides in the facility with which the nuts 280 can be adjusted to vary the gripping pressure. Upward advancement of these nuts on their respective rod members 272 will increase the clamping action and vice versa.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A protective tape applicator comprising a work table for supporting a sheet of material having a surface to be protected, a carriage movable relative to said table, a rocker assembly pivotally mounted on said carriage for supporting a roll of pressure sensitive tape, a pressing roller carried by said rocker assembly for applying pressure to the upper side of said tape as said carriage is moved along said table, a first stop element on said table, means actuatable by the rocker assembly into engagement with said stop element when said rocker assembly is in a tilted position and disengageable from said stop element when said rocker assembly is pivoted in a reverse direction, pivoting of the rocker assembly into a tilted position serving to elevate said pressing roller with respect to said table and pivoting of said rocker assembly in the reverse direction serving to lower said pressing roller relative to the table, said first stop element acting to position longitudinally said carriage with said pressing roller in a raised condition at a preferred longitudinal location relative to the table and hence to one end of the sheet when said carriage is moved in one direction, a second stop element on said table, and means actuatable by the rocker assembly when said rocker assembly has been pivoted in said reverse direction thereby to position said carriage at a preferred longitudinal location relative to the other end of said sheet.

2. A protective tape applicator in accordance with claim 1 including a rotatable drum on which said roll of pressure sensitive tape is mounted, and tension means associated with said drum for applying a preferred amount of drag on said tape as it is withdrawn from the drum.

3. A protective tape applicator in accordance with claim 1 including a rotatable drum on which said roll of table for locating said other end of the sheet.

4. A protective tape applicator comprising a work table for supporting a sheet of material having a surface to be protected, a carriage movable relative to said table, a rocker assembly pivotally mounted on said carriage for supporting a roll of pressure sensitive tape, a pressing roller carried by said rocker assembly for applying pressure to the upper side of said tape as said carriage is moved relative to the table, means on said carriage engageable with said rocker assembly for releasably retaining said assembly in a tilted position to elevate said pressing roller with respect to said table, first stop means for positioning said carriage at one preferred longitudinal position relative the table and second stop means for positioning said carriage at a second preferred longitudinal position relative to the table.

5. A protective tape applicator in accordance with claim 4 including a rotatable drum on said rocker assembly on which said roll of pressure sensitive tape is mounted, and tension means associated with said drum for controlling the amount of drag on said tape as it is withdrawn from said roll.

6. A protective tape applicator comprising a work table for supporting a sheet of material having a surface to be protected, a pair of parallel tracks disposed adjacent the sides of said table, a carriage movable along said tracks, a rocker assembly pivotally mounted on said carriage for supporting a roll of pressure sensitive tape, a pressing roller carried by said rocker assembly for applying pressure to the upper side of said tape as said carriage is moved relative to the table, means on said carriage engageable with said rocker assembly for releasably retaining said assembly in a tilted position to elevate said pressing roller with respect to said table, a first stop element on said table, means movable by the rocker assembly into engagement with said stop element when said rocker assembly is in said tilted position to locate said pressing roller above one edge of said sheet when the carriage is moved in one direction and disengageable from said stop element when said rocker assembly is pivoted in a direction to lower said pressing roller, a second stop element on said table, and means movable by the rocker assembly into engagement with said second stop element when said rocker assembly is pivoted in a direction to lower said pressing roller so that said carriage is arrested in its travel when said pressing roller is adjacent the edge of said sheet lying opposite said one edge.

7. A protective tape applicator in accordance with claim 6 in which said last mentioned means disengages from said second stop element when the rocker assembly is returned to its tilted position to thereby elevate said pressing roller.

8. A protective tape applicator in accordance with claim 7 including a transverse knife member disposed to sever said tape after disengagement of said last mentioned means from said second stop element when said carriage is again moved in said one direction.

9. A protective tape applicator in accordance with claim 8 including a follow-up roller journaled on said carriage for pressing the detached end of the tape against said sheet after its severance from said roll, and spring biased positioning means near one end of the table for locating one end of said sheet, said positioning means being depressible to permit passage of said follow-up roller over said other end of the sheet.

10. A protective tape applicator comprising a work table for supporting a sheet of material having a surface to be protected, a pair of parallel tracks disposed adjacent the sides of said table, a carriage movable along said tracks, a rocker assembly pivotally mounted on said carriage for supporting a roll of pressure sensitive tape, a pressing roller carried by said rocker assembly for applying pressure to the upper side of said tape as said carriage is moved relative to the table and said sheet, latch means on said carriage engageable with said rocker assembly for releasably retaining said assembly in a tilted position to elevate said pressing roller with respect to said table, a first stop element located on one side of said table, a pivotal dog element mounted on said carriage, a link member articulatively connected to said dog element and the rocker assembly to support said dog element at an elevation to engage said stop element when said rocker assembly is held in a tilted position by said latch means and at an elevation above said stop element when the rocker assembly is pivoted in a direction to lower said pressing roller, said stop element being located so as to position said carriage with said pressing roller above one edge of said sheet when the carriage is moved in one direction, a second stop element located on the other side of said table, a second pivotal dog element mounted on said carriage, a link member articulatively connected to said second dog element and the rocker assembly to support and said second dog element at an elevation above said second stop element when said rocker assembly is in its tilted position by said latch means and at an elevation to engage said second stop element when the rocker assembly is pivoted in a direction to lower said pressing roller, said second stop element being located so as to arrest said carriage as said pressing roller approaches the far edge of said sheet when said latch means is disengaged.

11. A protective tape applicator in accordance with claim 10 including a cam strip superimposed over said first stop element, said first mentioned link member having a slot therein and a pivot pin extending from said first dog element through said slot, thereby to permit said cam strip to raise said first dog element during the return travel of the carriage so as to avoid interference between said first dog element and said first stop element.

12. A protective tape applicator comprising a work table for supporting a sheet of material having a surface to be protected, a carriage movable relative to said table, a rocker assembly pivotally mounted on said carriage, a pair of offset shafts on said rocker assembly each for supporting a roll of pressure sensitive tape, a pressing roller carried by said rocker assembly for applying pressure to the upper sides of the tapes from said rolls as said carriage is moved relative to said table and said sheet, means assisting in the locating of said carriage for the initiation of a tape applying operation, and means assisting in the locating of said carriage for the completion of the tape applying operation.

13. A protective tape applicator in accordance with claim 12 including a rotatable drum on each shaft equipped with tension adjusting means projecting from one end thereof, the offset relation between shafts being of sufficient magnitude to avoid interference between one end of the drum on one shaft and the tension adjusting means of the drum on the other shaft.

14. A protective tape applicator comprising a work table for supporting a sheet of material having a surface to be protected, a carriage movable relative to said table, a rocker assembly pivotally mounted on said carriage, a pair of offset shafts on said rocker assembly, a rotatable drum on each shaft for supporting a roll of pressure sensitive tape, each drum including friction means for adjusting the tensional drag thereon by the tape as it is removed from its particular roll, and a pressing roller carried by said rocker assembly for applying pressure to the upper sides of the tapes from said rolls as said carriage is moved relative to said table and said sheet.

15. A protective tape applicator in accordance with claim 14 including a guide bar provided with a series of alternate circumferential ribs and grooves directing the tapes under said pressing roller.

16. In a protective tape applicator, a rotatable drum for supporting a roll of pressure sensitive tape for application to a surface to be protected, mounting means for said drum, means for permitting the moving of said mounting means longitudinally relative to said surface, and friction means interposed between said drum and said mounting means for imposing a tensional drag on the drum as tape is withdrawn from said roll.

17. A protective tape applicator comprising a work support for supporting a sheet of material having a surface to be protected, a carriage movable relative to said support, a rocker assembly pivotally mounted on said carriage for supporting a roll of pressure sensitive tape, a pressing roller carried by said rocker assembly, rocking of said assembly in one direction lowering said roller against the upper side of said tape and rocking of said assembly in the opposite direction raising said roller from said tape, and a transverse knife element supported on said carriage and located near said roller, whereby rocking of said assembly in said opposite direction after some of the tape from said roll has been adhered to said sheet will present an inclined tape region for severance by said knife element upon continued relative movement of said carriage after raising of said pressing roller.

18. A protective tape applicator in accordance with claim 17 in which said knife element has a cutting edge of irregular appearance.

19. A protective tape applicator in accordance with claim 18 in which said irregular appearance is undulated.

20. A protective tape applicator comprising a work support for supporting a sheet of material having a surface to be protected, a carriage movable relative to said support, a rocker assembly pivotally mounted on said carriage for supporting a roll of pressure sensitive tape, a pressing roller carried by said rocker assembly, a pick-up roller also supported by said rocker assembly adjacent the forward side of said pressing roller over which tape from said roll is directed in its path to a locus under said pressing roller, and a transverse knife element supported on said carriage and located near the rear side of said pressing roller, whereby raising of said pressing roller by tilting said rocker assembly in one direction renders the tape taut between said roll and said sheet so that continued advancement of said carriage will cause severance of said tape.

21. A protective tape applicator in accordance with claim 20 including a follow-up roller for pressing against the sheet that portion of said tape detached in the severing step.

22. A protective tape applicator comprising a work table for supporting a relatively thin sheet of material having a surface to be protected, a carriage movable relative to said table from one end thereof to the other, a rocker assembly pivotally mounted on said carriage, a rotatable drum mounted on said rocker assembly for supporting a roll of pressure sensitive tape, a pressing roller carried by said rocker assembly for applying pressure to the upper side of the tape from said roll as said carriage is moved from said one end toward the other, and means at said one end of the table for maintaining a fixed relationship between the edge of said sheet adjacent said one end of the table and the table itself to anchor said adjacent sheet end against the pull exerted by said tape as it is unrolled from said drum.

23. A protective tape applicator in accordance with claim 22 in which said means includes a clamping member for engaging the upper surface of said sheet at said adjacent edge thereof.

24. A protective tape applicator in accordance with claim 22 in which said means includes a plurality of clamping members constrained for vertical movement, each member having a horizontally directed lip for overlying a small section of the upper surface of said sheet at said adjacent edge thereof.

25. A protective tape applicator comprising a work table for supporting a relatively thin sheet of material having a surface to be protected, a carriage movable relative to said table from one end thereof to the other having a cam plate mounted thereon, a rocker assembly pivotally mounted on said carriage, a rotatable drum mounted on said rocker assembly for supporting a roll of pressure sensitive tape, a pressing roller carried by said rocker assembly for applying pressure to the upper side of the tape from said roll as said carriage is moved from said one end toward the other, a plurality of gripping members at said one end of the table disposed for vertical reciprocation and equipped with horizontally projecting fingers adapted to clamp the edge of said sheet adjacent said one end of the table, means for actuating said gripping members from a raised position into a lowered clamping position, and a cross bar suspended from the lower ends of said gripping members engageable by said cam plate to lower automatically the gripping members when said carriage is moved to said one end of the table.

26. A protective tape applicator in accordance with claim 25 including a coil spring between each lower end of the gripping members and said cross bar.

27. A protective tape applicator in accordance with claim 26 in which said actuating means includes an over-center mechanism for maintaining said gripping members in said clamping position.

28. A protective tape applicator comprising a work table for supporting a relatively thin sheet of material having a surface to be protected, a carriage movable relative to said table from one end thereof to the other having a cam plate mounted thereon, a rocker assembly pivotally mounted on said carriage, a rotatable drum mounted on said rocker assembly for supporting a roll of pressure sensitive tape, a pressing roller carried by said rocker assembly for applying pressure to the upper side of the tape from said roll as said carriage is moved from said one end toward the other, a plurality of gripping members at said one end of the table disposed for vertical reciprocation and equipped with horizontally projecting fingers adapted to clamp the edge of said sheet adjacent said one end of the table, means for actuating said gripping members from a raised position into a lowered clamping position including a cross bar, said cross bar being engageable by said cam plate to cause said actuating means to automatically lower the gripping members when said carriage is moved to said one end of the table.

29. A protective tape applicator comprising a work table for supporting a relatively thin sheet of material having a surface to be protected, a carriage movable relative to said table from one end thereof to the other having a cam plate mounted thereon, a rocker assembly pivotally mounted on said carriage, a rotatable drum mounted on said rocker assembly for supporting a roll of pressure sensitive tape, a pressing roller carried by said rocker assembly for applying pressure to the upper side of the tape from said roll as said carriage is moved from said one end toward the other, a plurality of gripping members at said one end of the table disposed for vertical reciprocation and equipped with horizontally projecting fingers adapted to clamp the edge of said sheet adjacent said one end of the table, a coil spring encircling the lower portion of each gripping member, means secured to the lower ends of each gripping member in engagement with the lower ends of said springs to retain said springs in their encircling relation, and means engageable with the upper end of each spring for applying pressure thereto to actuate said gripping members into a clamping position, said last-mentioned means being actuatable by said cross bar.

30. A protective tape applicator in accordance with claim 29 in which said last-mentioned means includes a pivotal cross bar having mounted thereon a plurality of arms, one of each arms being engageable with the upper end of one of said springs, and an over center mechanism actuatable by said first-mentioned cross bar for pivoting said second-mentioned cross bar in a direction to apply pressure to said springs via said arms.

References Cited in the file of this patent

UNITED STATES PATENTS

| | | |
|---|---|---|
| 2,033,578 | Kittel | Mar. 10, 1936 |
| 2,203,977 | Bennett | June 11, 1940 |
| 2,483,779 | Mucher | Oct. 4, 1949 |
| 2,514,264 | Soper | July 4, 1950 |
| 2,711,776 | Woodburn | June 28, 1955 |